US010920578B2

(12) United States Patent
San Martin et al.

(10) Patent No.: US 10,920,578 B2
(45) Date of Patent: Feb. 16, 2021

(54) METHOD FOR FINDING POSITION OF COLLARS

(71) Applicant: Halliburton Energy Services, Inc., Houston, TX (US)

(72) Inventors: Luis Emilio San Martin, Houston, TX (US); Ahmed Elsayed Fouda, Spring, TX (US); Ilker R. Capoglu, Houston, TX (US); Wolfgang Harmut Nitsche, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 212 days.

(21) Appl. No.: 15/774,528

(22) PCT Filed: Apr. 12, 2017

(86) PCT No.: PCT/US2017/027233
§ 371 (c)(1),
(2) Date: May 8, 2018

(87) PCT Pub. No.: WO2018/190831
PCT Pub. Date: Oct. 18, 2018

(65) Prior Publication Data
US 2020/0284141 A1    Sep. 10, 2020

(51) Int. Cl.
*E21B 47/09* (2012.01)
*E21B 47/092* (2012.01)
(Continued)

(52) U.S. Cl.
CPC .............. *E21B 47/09* (2013.01); *E21B 47/02* (2013.01); *E21B 47/092* (2020.05); *E21B 47/13* (2020.05)

(58) Field of Classification Search
CPC ........... E21B 47/09; E21B 47/02; E21B 47/13
See application file for complete search history.

(56) References Cited

U.S. PATENT DOCUMENTS

| 4,808,925 A | 2/1989 | Baird |
| 6,084,403 A | 6/2000 | Sinclair et al. |

(Continued)

FOREIGN PATENT DOCUMENTS

| WO | 2010040045 | 4/2010 |
| WO | 2016007282 | 1/2016 |

OTHER PUBLICATIONS

International Search Report and Written Opinion for Application No. PCT/US2017/027233 dated Nov. 28, 2017.

(Continued)

*Primary Examiner* — Michael R Wills, III
(74) *Attorney, Agent, or Firm* — John Wustenberg; C. Tumey Law Group PLLC (57) ABSTRACT

A method and system for determining location of a collar in a wellbore. A method may comprise taking an electromagnetic measurement, producing an electromagnetic log from the electromagnetic measurement, wherein the electromagnetic log comprises a plurality of channels, and locating a position of the collar in the electromagnetic log based on a collar signature in the electromagnetic log. A system may comprise an electromagnetic logging tool. The electromagnetic logging tool may comprise at least one receiver and at least one transmitter. The system may further comprise a conveyance and an information handling system, wherein the information handling system is configured to receive an electromagnetic measurement from the electromagnetic logging tool, produce an electromagnetic log from the electromagnetic measurement, wherein the electromagnetic log comprises at least one channel, and locate a position of a collar in the electromagnetic log with a collar signature.

20 Claims, 8 Drawing Sheets

(51) Int. Cl.
  *E21B 47/13*   (2012.01)
  *E21B 47/02*   (2006.01)

(56) References Cited

U.S. PATENT DOCUMENTS

| | | | |
|---|---|---|---|
| 9,798,035 B2 | 10/2017 | Fouda et al. | |
| 2009/0195244 A1 | 8/2009 | Mouget et al. | |
| 2012/0268135 A1* | 10/2012 | Marsala | G01V 3/30 |
| | | | 324/338 |
| 2014/0203811 A1* | 7/2014 | Marsala | G01V 3/20 |
| | | | 324/338 |
| 2014/0216734 A1 | 8/2014 | Hupp | |
| 2016/0290122 A1 | 10/2016 | San Martin et al. | |
| 2018/0313207 A1* | 11/2018 | Khalaj Amineh | E21B 47/085 |

OTHER PUBLICATIONS

J. Garcia et al., "Successful application of a new electromagnetic corrosion tool for well integrity evaluation in old wells completed with reduced diameter tubular," presented Mar. 26-28, 2013. IPTC 16997.

A. A. Arbuzov et al., "Memory magnetic imaging defectoscopy," Presented Oct. 16-18, 2012. SPE 162054.

\* cited by examiner

METHOD FOR FINDING POSITION OF COLLARS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying collars with electromagnetic logging tool. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tool may include an independent power supply and may store the acquired data on memory. A magnetic core may be used in defect detection in multiple concentric pipes.

In EM logging tools, the interpretation of the data may be based on differences between responses at two different points within the EM log, a point representing a nominal section and a point where thickness may be estimated. The response differences may be processed to determine the change in wall thickness within a tubular.

Figure 1:
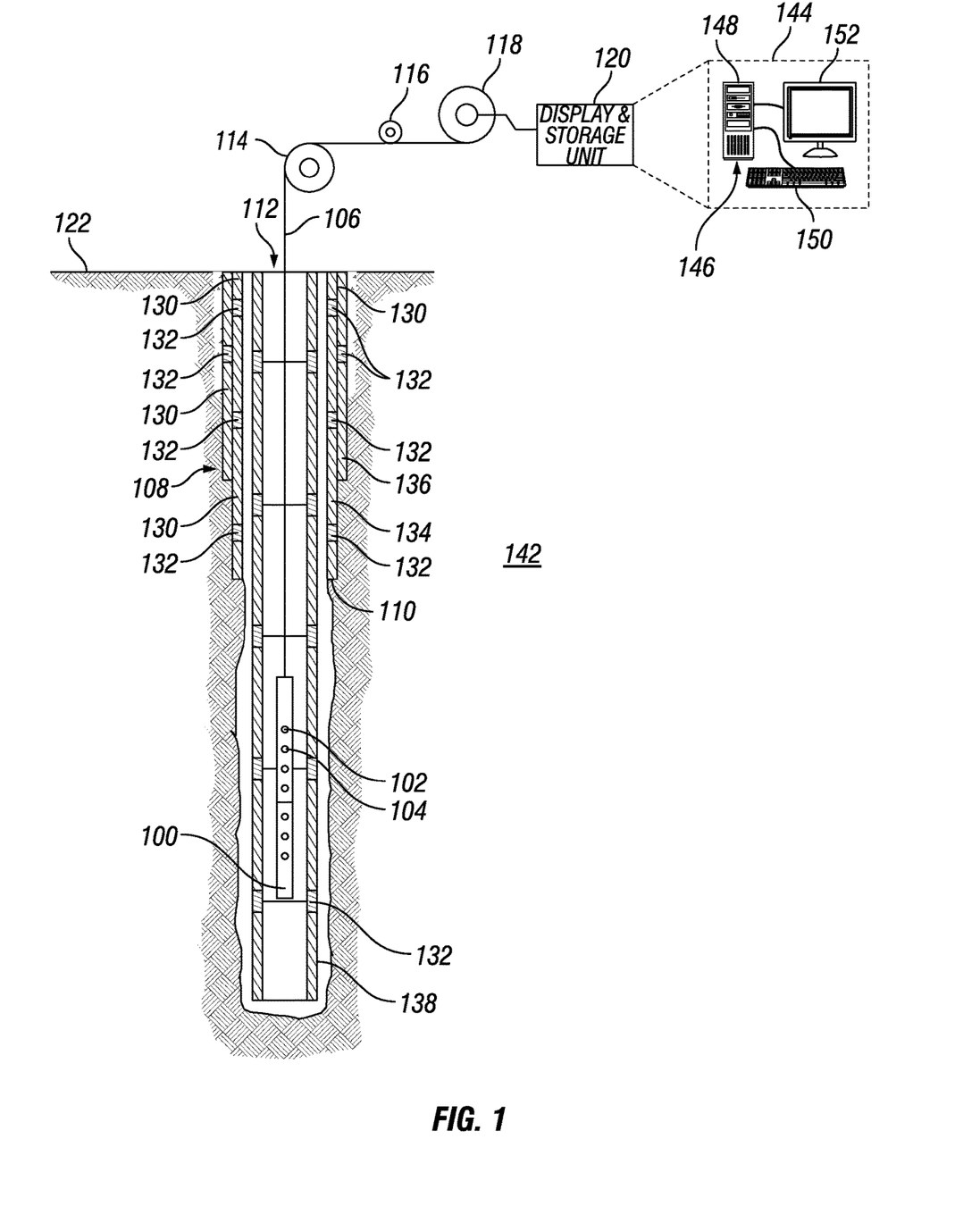
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may transmit electromagnetic fields into subterranean formation 142. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed along with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due to the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the EM logging tool 100 from transmitter 102, as shown on FIG. 1. Alternatively, the secondary electromagnetic fields may be measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant and/or the spacing between transmitters 102 and/or receiver 104 is large enough that the contribution to the mutual impedance from the dominant (but evanescent) waveguide mode is small compared to the contribution to the mutual impedance from the branch cut component, the remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}t \quad (1)$$

and the magnitude of the impedance shows the dependence:

$$\exp[-2(\sqrt{\omega\mu\sigma/2})t] \quad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \quad (3)$$

The phase of the impedance varies as:

$$\varphi \simeq 2\frac{t}{\delta} \quad (4)$$

and the magnitude of the impedance shows the dependence:

$$\exp[-2t/\delta] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes.

Figure 2:
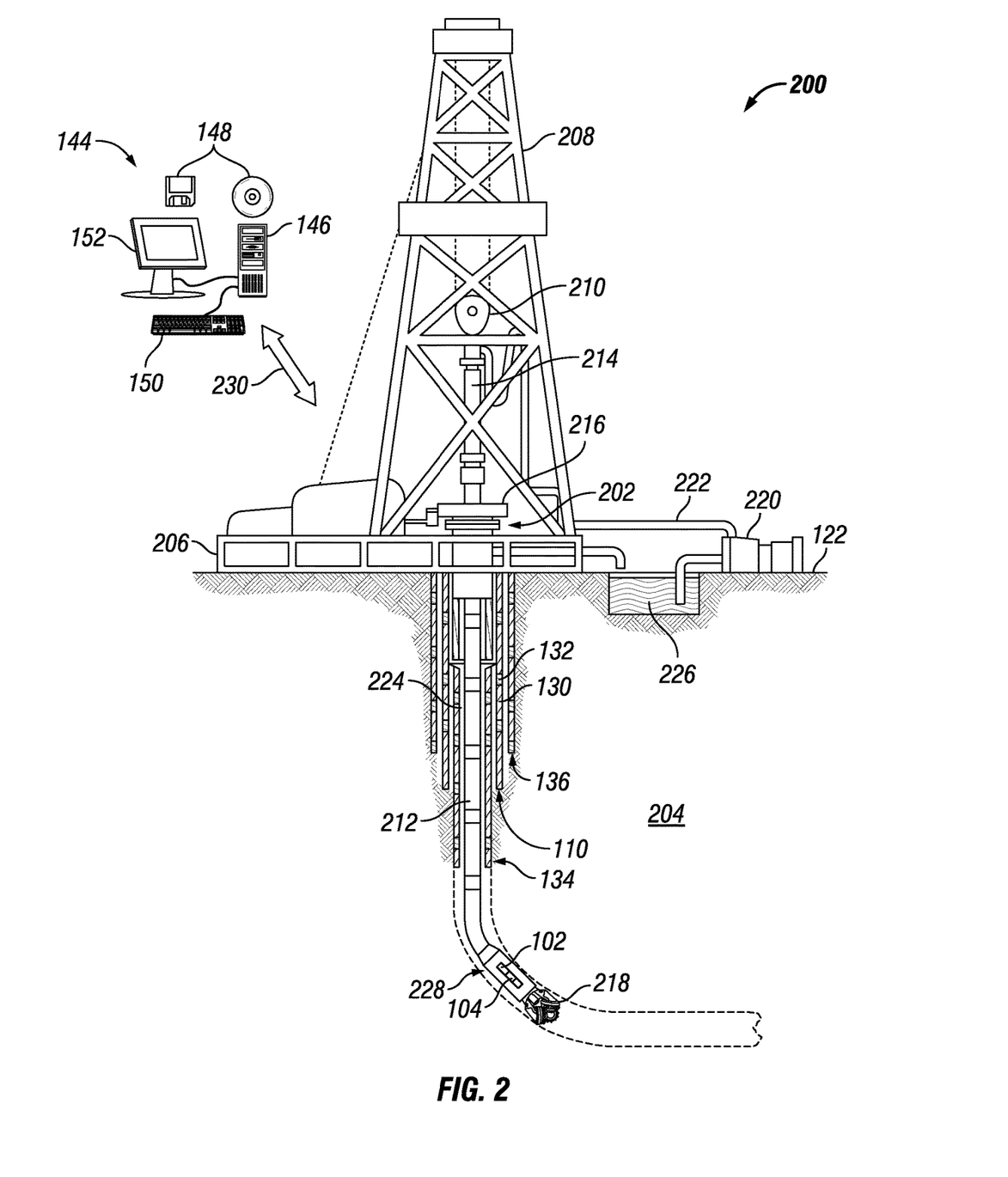
FIG. 2 illustrates an example of an EM logging tool used with a drilling system.

FIG. 2 illustrates an example in which EM logging tool 100 (Referring to FIG. 1) may be disposed in a drilling system 200. As illustrated, wellbore 110 (Referring to FIG. 1) may extend from a wellhead 202 into a subterranean formation 204 from surface 122 (Referring to FIG. 1). Generally, wellbore 110 may include horizontal, vertical, slanted, curved, and other types of wellbore geometries and orientations. Wellbore 110 may be cased or uncased. In examples, wellbore 110 may comprise a metallic material. By way of example, the metallic member may be a casing, liner, tubing, or other elongated steel tubular disposed in wellbore 110.

As illustrated, wellbore 110 may extend through subterranean fojination 204. As illustrated in FIG. 2, wellbore 110 may extending generally vertically into the subterranean formation 204, however wellbore 110 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 122. Without limitation, drill bit 218 may include, roller cone bits, PDC bits, natural diamond bits, any hole openers, reamers, coring bits, and the like. As drill bit 218 rotates, it may create and extend wellbore 110 that penetrates various subterranean formations 204. A pump 220 may circulate drilling fluid through a feed pipe 222 to kelly 214, downhole through interior of drill string 212, through orifices in drill bit 218, back to surface 122 via annulus 224 surrounding drill string 212, and into a retention pit 226.

With continued reference to FIG. 2, drill string 212 may begin at wellhead 202 and may traverse wellbore 110 (Referring to FIG. 1). Drill bit 218 may be attached to a distal end of drill string 212 and may be driven, for example, either by a downhole motor and/or via rotation of drill string 212 from surface 122 (Referring to FIG. 1). Drill bit 218 may be a part of bottom hole assembly 228 at distal end of drill string 212. Bottom hole assembly 228 may further comprise EM logging tool 100 (Referring to FIG. 1). EM logging tool 100 may be disposed on the outside and/or within bottom hole assembly 228. EM logging tool 100 may comprise a plurality of transmitters 102 and/or receivers 104 (Referring to FIG. 1). EM logging tool 100 and/or the plurality of transmitters 102 and/or receivers 104 may operate and/or function as described above. As will be appreciated by those of ordinary skill in the art, bottom hole assembly 228 may be a measurement-while drilling (MWD) or logging-while-drilling (LWD) system.

Without limitation, bottom hole assembly 228, transmitter 102, and/or receiver 104 may be connected to and/or controlled by information handling system 144, which may be disposed on surface 122(Referring to FIG. 1). Without limitation, information handling system 144 may be disposed down hole in bottom hole assembly 228. Processing of information recorded may occur down hole and/or on surface 122. Processing occurring downhole may be transmitted to surface 122 to be recorded, observed, and/or further analyzed. Additionally, information recorded on information handling system 144 that may be disposed down hole may be stored until bottom hole assembly 228 may be brought to surface 122. In examples, information handling system 144 may communicate with bottom hole assembly 228 through a communication line (not illustrated) disposed in (or on) drill string 212. In examples, wireless communication may be used to transmit information back and forth between information handling system 144 and bottom hole assembly 228. Information handling system 144 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 122. Alternatively, raw measurements from bottom hole assembly 228 may be transmitted to surface 122.

Any suitable technique may be used for transmitting signals from bottom hole assembly 228 to surface 122, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 122. Without limitation, an electromagnetic source in the telemetry subassembly may be operable to generate pressure pulses in the drilling fluid that propagate along the fluid stream to surface 122. At surface 122, pressure transducers (not shown) may convert the pressure signal into electrical signals for a digitizer (not illustrated). The digitizer may supply a digital form of the telemetry signals to information handling system 144 via a communication link 230, which may be a wired or wireless link. The telemetry data may be analyzed and processed by information handling system 144.

As illustrated, communication link 230 (which may be wired or wireless, for example) may be provided that may transmit data from bottom hole assembly 228 to an information handling system 144 at surface 122. Information handling system 144 may include a processing unit 146 (Referring to FIG. 1), output devices 152 (Referring to FIG. 1), an input device 150 (e.g., keyboard, mouse, etc.) (Referring to FIG. 1), and/or non-transitory computer readable media 148 (e.g., optical disks, magnetic disks) (Referring to FIG. 1) that may store code representative of the methods described herein. In addition to, or in place of processing at surface 122, processing may occur downhole.

Bottom hole assembly 228 may comprise a transmitter 102 and/or a receiver 104 (Referring to FIG. 1). In examples, bottom hole assembly 228 may operate with additional equipment (not illustrated) on surface 122 and/or disposed in a separate well measurement system (not illustrated) to record measurements and/or values from subterranean formation 204. During operations, transmitter 102 may broadcast a signal from bottom hole assembly 228. Transmitter 102 may be connected to information handling system 144, which may further control the operation of transmitter 102. Additionally, receiver 104 may measure and/or record signals broadcasted from transmitter 102. Receiver 104 may transfer recorded information to information handling system 144. Information handling system 144 may control the operation of receiver 104. For example, the broadcasted signal from transmitter 102 may be reflected by casing string 108 (i.e. first casing 134, second casing 136, and/or any number of additional casings), pipe string 138, and/or subterranean formation 204. It should be noted that first casing 134 and second casing 136 comprises joints 130, which may be connect by collars 132. (Referring to FIG. 1). The reflected signal may be recorded by receiver 104. The recorded signal may be transferred to information handling system 144 for further processing. In examples, there may be any suitable number of transmitters 102 and/or receivers 104, which may be controlled by information handling system 144. Information and/or measurements may be processed further by information handling system 144 to determine properties of wellbore 110, casing string 108, pipe string 138, collars 132, (Referring to FIG. 1), fluids, and/or subterranean formation 204.

Figure 3:
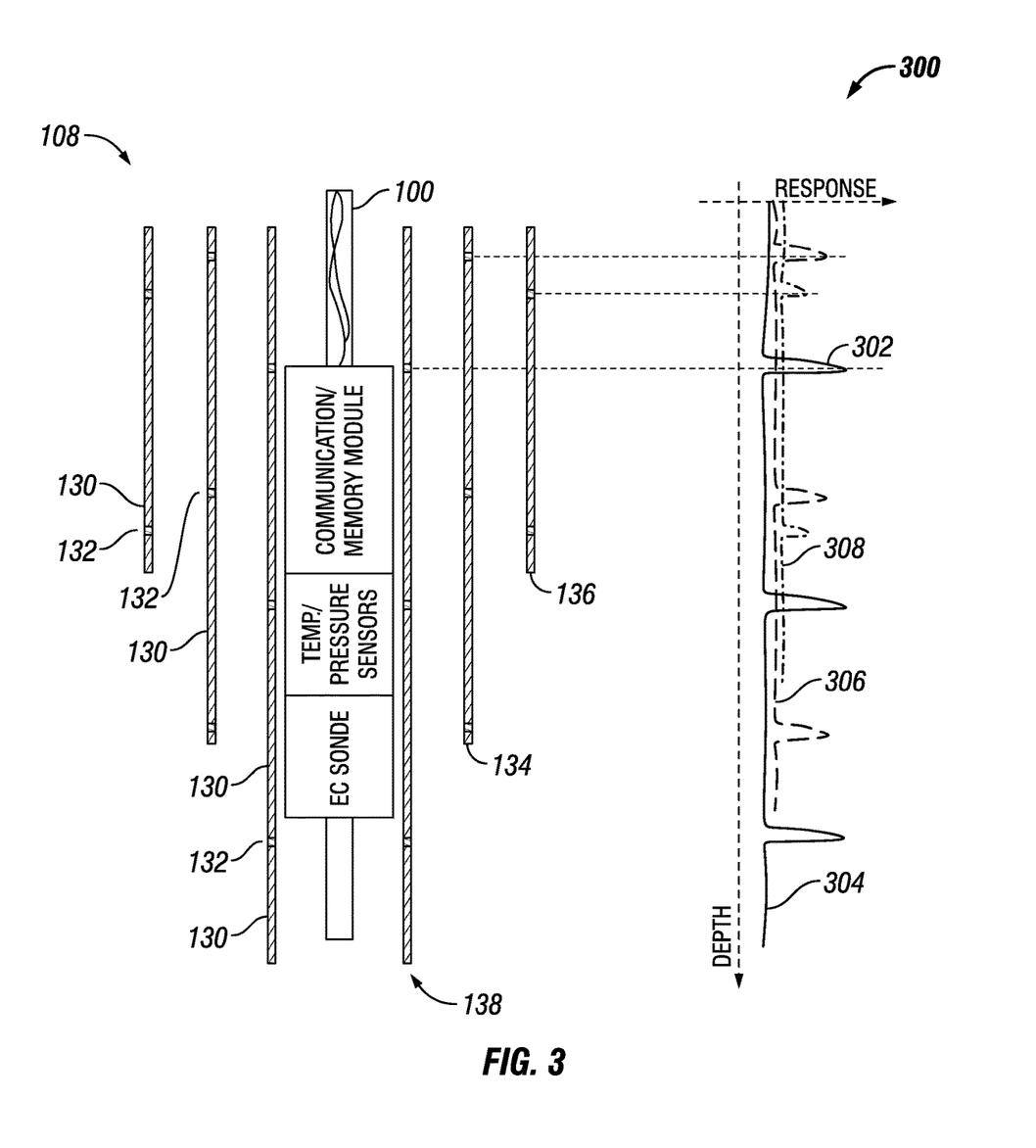
FIG. 3 illustrates an example of an EM log in relation to a collar.

As mentioned above, methods may be utilized to determine the location of collars 132 (Referring to FIG. 1). FIG. 3 illustrates EM logging tool 100 disposed in pipe string 138 and casing string 108, wherein casing string 108 comprises first casing 134 and second casing 136. (Referring to FIG. 1). FIG. 3 correlates the position of collars 132 with EM log 300. Further, EM log 300 illustrates EM response 302 which may indicate the location of a collar 132. Collars 132 may often be a tubular pipe section that is threaded inside and used to connect a joint 130 to an adjacent joint 130. In examples, coupling between each joint 130 may be accomplished by engaging threads disposed on individual joints 130, in which case the amount of extra metal associated to collar 132 may be relatively small. Thus, concentric pipe has larger thickness at each collar 132, which leads to larger responses recorded by EM logging tool 100 and displayed in EM log 300. EM response 304 illustrates the recorded response from pipe string 138. EM response 306 illustrates the recorded response from first casing 134. EM response 308 illustrates the recorded response from second casing 136. EM responses 304, 306, and 308 may be combined in EM log 300, which may give a detailed analysis of the location of collars 132 within wellbore 110. (Referring to FIG. 1).

The detection of collars 132 may be helped by the approximate periodicity that the signals associated to collars 132 may comprise, since in many cases the lengths of joints 130 may be similar for a given concentric pipe diameter. In examples, lengths of joints 130 may not be perfectly periodic but close to periodic, as illustrated in FIG. 3, it may save time in interpretation, by providing estimates for the position of collars 132. When a concentric pipe contains joints 130 of varying lengths, a method applicable to non-periodic cases may be needed. This method may comprise processing measurements from EM logging tools 100 (Referring to FIG. 1).

EM logging tool 100 (Referring to FIG. 1) may be a precisions measuring electronic tool or a continuous wave frequency domain tool. Usually, both frequency and time domain operations have multiple channels to record measurements. In the time domain there may be many different time-channels utilized. In the frequency domain there may be many different frequencies that may be utilized. Thus, measurements by EM logging tool 100 in the frequency domain or time domain may be interpreted by different methods.

For example, the data may be processed by using the remote field eddy current (RFEC) theory that uses a linear relationship between total thickness and phase of the detected EM field at a sufficient distance to be within the RFEC regime. The data from multiple channels may also be processed with numerical inversion to extract the thickness of individual concentric pipes in casing string 108 and/or pipe string 138. In examples, determining the position of collars 132 in casing string 108 and/or pipe string 138 may facilitate the assessment of the thicknesses of concentric pipes in casing string 108 and/or pipe string 138. To determine the location of collars 132, prior information about geometry of collar 132 or a signal signature of collar 132 from logs measured by EM logging tool 100 (referring to FIG. 1) may be utilized.

Figure 4A:
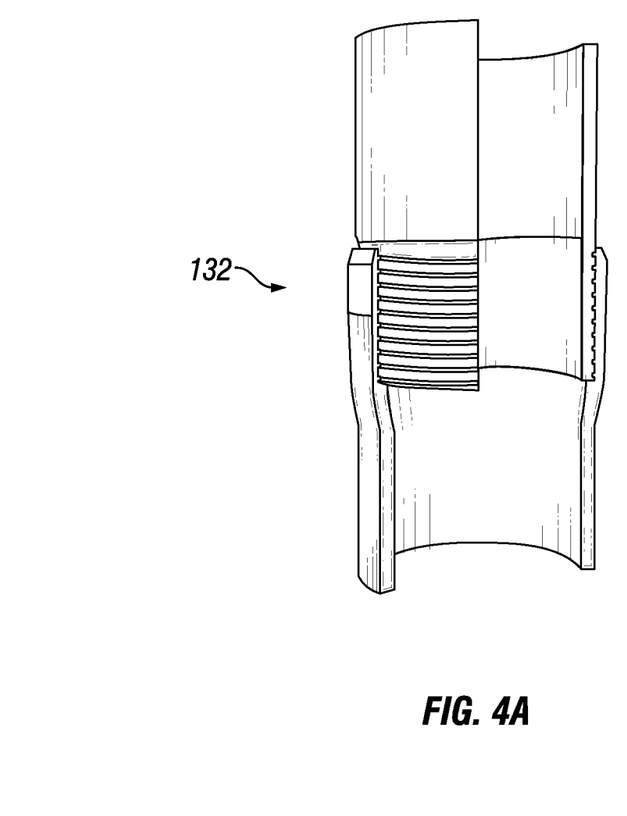
FIG. 4A illustrates an example of a collar.
Figure 4B:
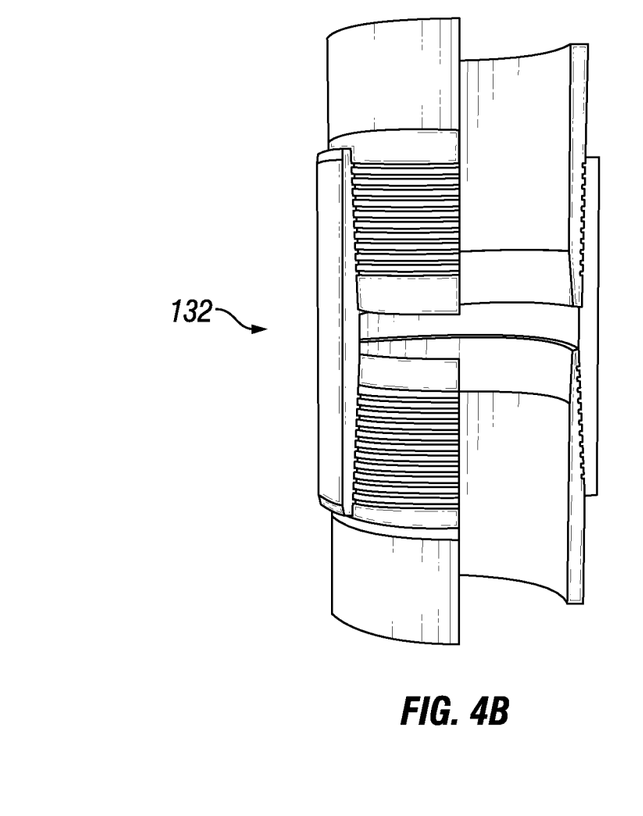
FIG. 4B illustrates another example of a collar.

Prior information about geometry of collar 132 may be utilized in determining the location of collar 132. Geometry of collars 132 may vary and the signal that collars 132 give depends on the amount of extra metal that collars 132 may add to concentric pipes. FIGS. 4A and 4B illustrated geometries of collars 132. As illustrated in FIG. 4A, relatively small amounts of metal have been added. In FIG. 4B, large amounts of metal have been added.

Identification of collars 132 may be complicated, as joints 130 (Referring to FIG. 1) for a given concentric pipe may not be perfectly periodic. When joints 130 may be periodic or close to periodic, a method for determining the location of a collars 132 in relation to FIG. 3 may be utilized.

For examples, a method may rely on modeling collars 132 for each of the different diameter concentric pipes and the signatures that collars 132 may induce in the multiple responses of EM logging tool 100 (Referring to FIG. 1). Further, signals measured of collar 132 may be utilized, which may be identified in some cases. This method may assess the correlation of collar signatures for collar 132 with the logs of those channels that may be particularly sensitive to collar 132 at a given diameter pipe and at a given position within casing string 108 and/or pipe string 138. In examples, the correlation of collar signatures may operate to evaluate the similarity between the signature of collar 132 and the log as a function of position. Functions such as covariance and misfit may be utilized during correlation. More than one channel may be used in the evaluation of the correlation. For example, each channel may produce a signature for collar 132. The points of high correlation may indicate the presence of a collar 132 at that position (As illustrated in FIG. 3). This method may be easily automatized by making the search for correlations automatic and establishing a threshold value, such that when the correlation goes above the threshold value a location of collar 132 may be identified. The search for correlations may be done with signatures of collars 132 in casing string 108 and/or pipe string 138. For example, signature of collars 132 in second casing 136 (Referring to FIG. 1) may correlate with other signatures of collars 132 in second casing 136 and from those high correlation values the presence of collars 132 in second casing 136 may be determined. This may be repeated for first casing 134, pipe string 138, and/or any number of additional casing layers in casing string 108.

Figure 5:
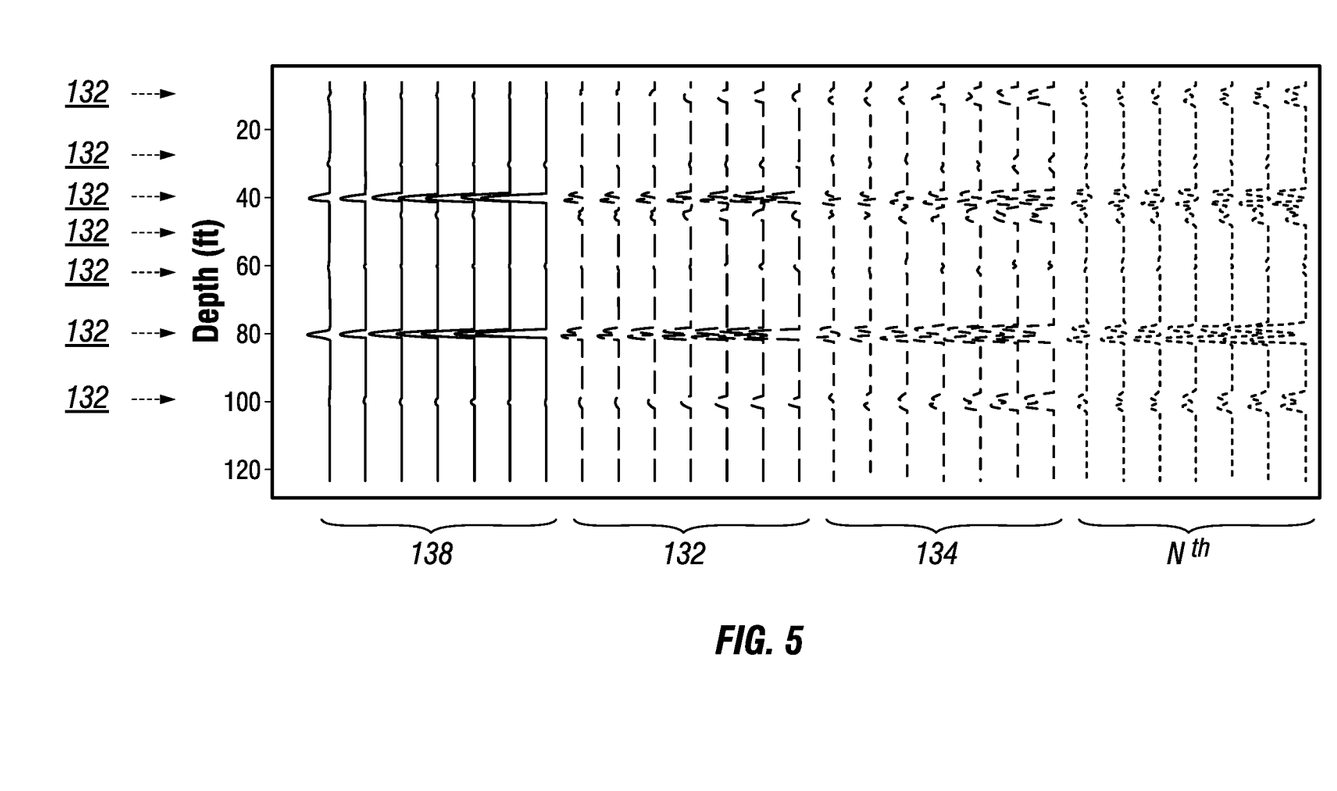
FIG. 5 illustrates an example of collar responses in a frequency domain at different layers of concentric pipe.
Figure 6:
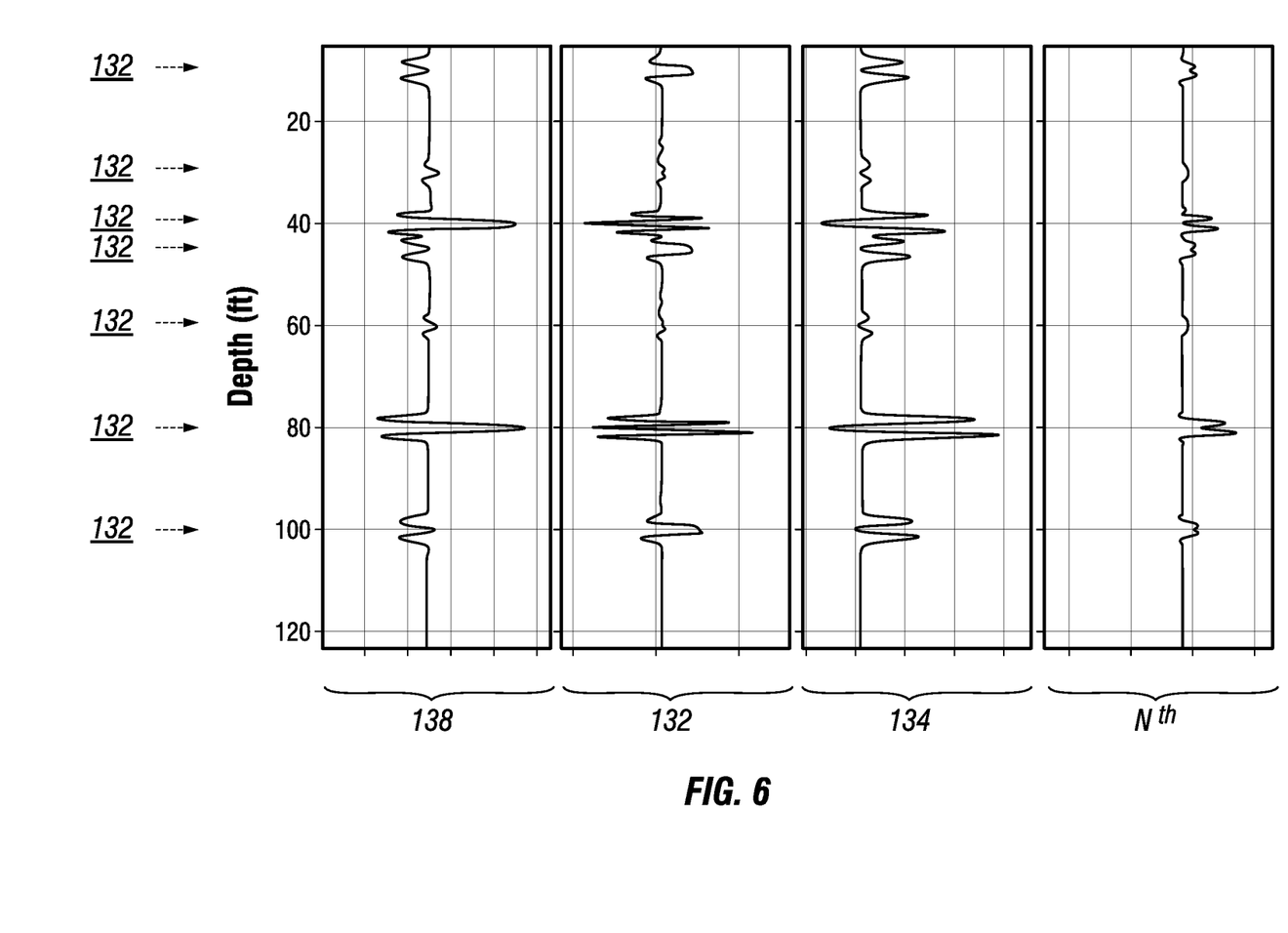
FIG. 6 illustrates an example of collar responses in a processed log at different layers of concentric pipe.

An example of determining collars 132 is shown in FIG. 5, where collars 132 in pipe string 138, first casing 134, and/or second casing 136 (Referring to FIG. 1) may be shown to have different effect on the different channels of EM logging tool 100 in a frequency domain. Curves shown in FIG. 5 are unprocessed curves, referred to as raw curves of EM logging tool 100. Curves shown in FIG. 6, may be curves that where processed with an inversion scheme that uses a 1D radial forward modeling to find the thicknesses of pipe string 138, first casing 134, and/or second casing 136.

The method disclosed for detection of collars 132 may comprise of measuring the correlation between a selected number of channel responses of EM logging tool 100 and signatures of collar 132 from simulated data or measured data of the same channels. That is, by evaluating the correlation between the measured log and the simulated and/or measured response the likely positions of collars 132 may be found. (Referring to FIG. 1).

Figure 7:
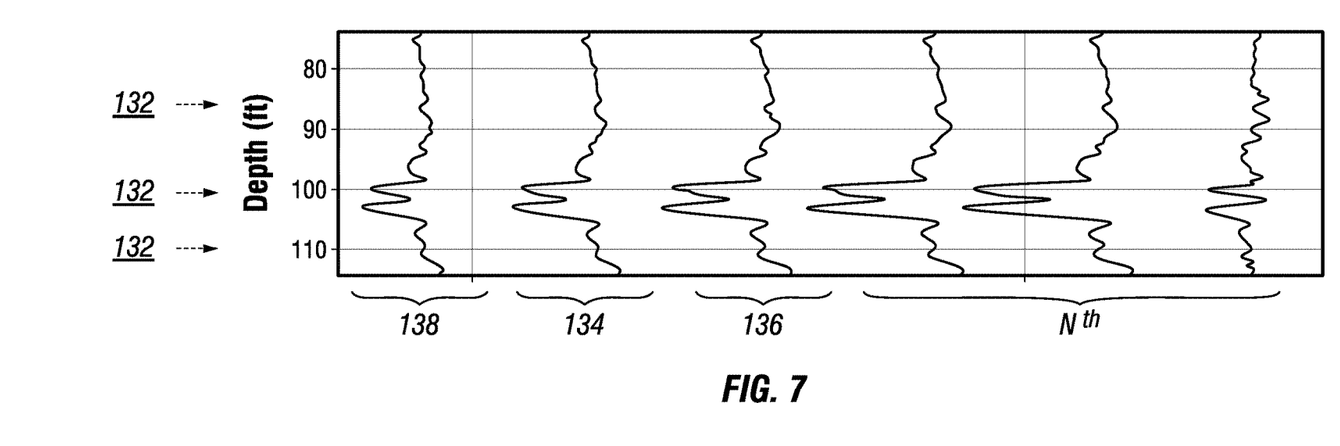
FIG. 7 illustrates an example of an EM log with patterns that may indicate a collar at different layers of pipe.

In FIG. 7, raw curves measured in the frequency domain by EM logging tool 100 are illustrated. Similarity between signatures of collars 132 in the simulation and the raw curves measured by EM logging tool 100. Three possible collar 132 identifications in pipe string 138, first casing 134, and/or second casing 136 are shown from measurements of receiver 104 from EM logging tool 100. (Referring to FIG. 1).

Figure 8A:
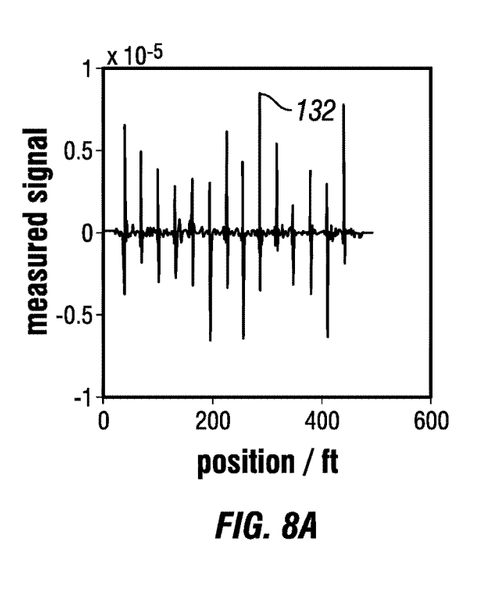
FIG. 8A illustrates an example of a correlation between a simulated response of a collar on a first layer of pipe and the measured EM log.
Figure 8B:
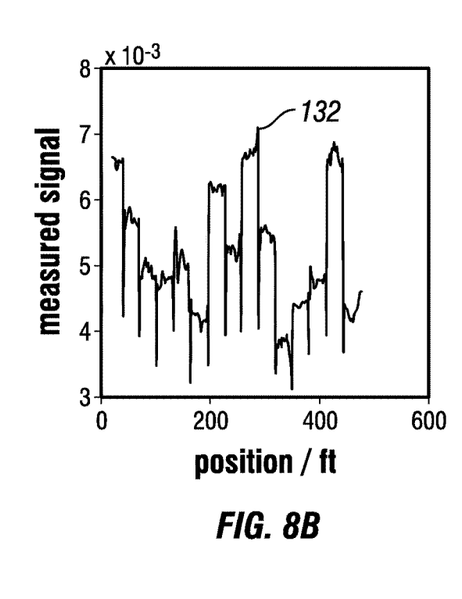
FIG. 8B illustrates an example of an EM log of a single channel.

In FIG. 8A illustrates the evaluation of the correlation between the log and the modeled response in one of the channels. FIG. 8A illustrates the correlation between the log and the simulated response of collar 132 on pipe string 138 for that same channel. FIG. 8B illustrates the channel response. The correlation in FIG. 8A shows maxima at the position of collar 132 pipe string 138. (Referring to FIG. 1).

From the identification of the maximums of the correlations, the position of collars 132 may be found. The method may be extended to correlation of multiple channels. For example, in Equation 6, below, the correlations between simulated collar responses and raw signals may be combined to generate an estimate of the position of collars 132.

$$\text{Estimated position of collars} = \{x, \text{ such that } C(x) \text{ is maximum}\} \quad (6)$$

Where the number of maxima chosen is equal to the number of collars 132 found. In examples, when multiple channels may be utilized from different receivers 104, which may be positioned at different relative distance with respect to transmitter 102, signatures of collar 132 in different channels may follow a specific spatial pattern. The pattern may depend on logging speed, which may be caused by a temporal sequence of appearance, in which the signature of collar 132 may be identified on different channels. There may be a level of agreement between signatures of collar 132 at different channels.

The values may be selected automatically and/or it may be selected and reviewed by a processing professional. The automatic selection may be implemented by establishing a threshold for the value of the correlation, a breach indicate the presence of collar 132. The value of the threshold may be adjusted with real field data to determine the location of collar 132.

The method may be generalized by using multiple channels and finding the position of collars 132 by combining the estimations of multiple channels. There may be different ways to combine the output of multiple channels. One possibility may be by multiplying all the correlations found for the different channels (combining the results of the correlations, each of them similar to the one shown in bottom of FIG. 8B). In general, the combination of the correlations of the different channels may be a function of the correlations and the positions of collars 132 found from it may be the maxima of this function.

$$\text{Estimated position of collars}=\{x, \text{ such that Max} \{F(c_1(x), c_2(x), \ldots, c_N(x))\}\} \quad (7)$$

In the above expression each c, represents the correlation curve obtained from each channel (equivalent to the curve shown at the bottom of FIG. 8B).

The method, as disclosed, may be applied to raw measurements (unprocessed measurements), of EM logging tool 100, to determine correlations between signatures of collars 132 and raw channel responses. The same method may also be applied to the processed results by processing the synthetic responses of collars 132 and comparing with the processed log. The method may be analogous to the one described here, except that in the case of the processed results there may be fewer curves because the processed results provide estimates for the thickness of different layers, so the number of curves to correlate may be equal to the number of different concentric pipes that may be present. For example, collar 132 in pipe string 138, the processed curves may generate thickness for each joint 130. (Referring to FIG. 1). These thicknesses that may be correlated with the thicknesses that may be obtained from the processing of the synthetic response to the presence of collar 132. The correlation may be between equivalent pipes, that is, the results of thickness for pipe string 138 in the simulation may be compared with the results of thickness of pipe string 138, first casing 134, and second casing 136. Thus, there may be a number of correlation curves equal to the number of concentric pipes in the test. These correlations may be combined as shown in Equation (6) and Equation (7), to obtain estimates for the position of collars 132.

Methods described above may be automated, as it may be based on evaluations of correlations and identification positions of collar 132 by assessing if value of the correlation above and/or below a certain threshold value. These two operations may be easily automatized. An automatic algorithm for finding the locations of collars 132 may be found through an automation process 900 illustrated in FIG. 9.

Figure 9:
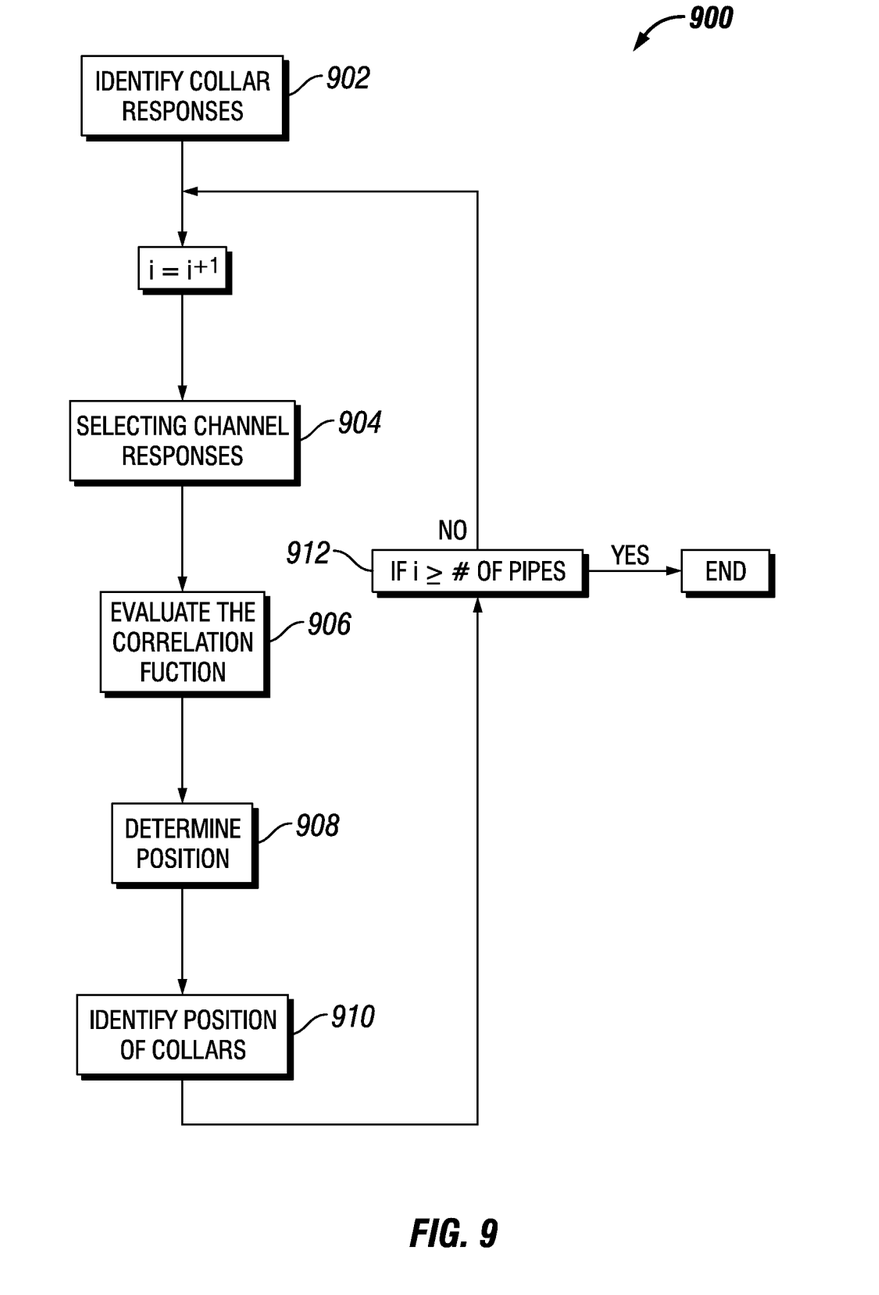
FIG. 9 illustrates an example of an automation process.

Automation process 900 may begin with identifying collar responses 902. Identification may take the form of modeling from collar geometry or identifying collars from raw measurements. Modeling form collar geometry may comprise numerical simulation of the collar geometry. After identifying collar responses 902, an operator may then select channel responses 904, which may be performed automatically by identifying channels that may be sensitive to a specific layer of concentric pipe. This may generate a log that may be specific to the responses from the chosen layer of concentric pipe. The number of measurement channel response may correlate with the found collar responses in a specific concentric pipe (denoted as i). After selecting channel responses 904, the results may be sent to evaluate the correlation function 906. In this step, the results are evaluated between the raw responses from selected channels and the collar responses of concentric pipe (i). After evaluating the correlations function 906, the results may be utilized to determine position 908 values. This may comprise determining if the position values of the correlation function is larger than a predefined threshold level. Once values have been determined, the process may identify position of collars 910. In identifying position of collars 910, collar responses on concentric pipe (i) may be represented as points where the correlation is larger than the threshold. In a determination step 912, if collar responses on concentric pipe (i) are greater than and/or equal to the number of pipes the process may end, if not, the process may loop back to selecting channel responses 904 and repeat through each step until determination step 912 ends the process.

The systems and methods may include any of the various features of the systems and methods disclosed herein, including one or more of the following statements.

Statement 1: A method for determining location of a collar in a wellbore may comprise taking an electromagnetic measurement, producing an electromagnetic log from the electromagnetic measurement, wherein the electromagnetic log comprises a plurality of channels, and locating a position of the collar in the electromagnetic log based on a collar signature in the electromagnetic log, wherein the collar signature comprises at least one channel from the plurality of channels.

Statement 2: The method of statement 1, wherein the electromagnetic log is a raw curve comprising a voltage from the at least one channel.

Statement 3: The method of statement 2 or statement 1, wherein the electromagnetic log is processed and comprises a thickness of at least one casing string or at least one pipe string.

Statement 4: The method of any preceding statement, wherein the collar signature is identified by a synthetic modeling of a collar geometry.

Statement 5: The method of any preceding statement, wherein the collar signature is obtained from the electromagnetic log.

Statement 6: The method of any preceding statement, wherein positions of a plurality of collars are identified by using at least one collar signature and the electromagnetic log.

Statement 7: The method of any preceding statement, wherein the locating a position of the collar comprises taking a correlation, a covariance, or a misfit between the collar signature and the electromagnetic log.

Statement 8: The method of any preceding statement, wherein a periodicity of the collar is used to filter the locating a position of the collar.

Statement 9: The method of any preceding statement, wherein a level of agreement between a plurality of collar locations obtained from different channels is used to filter the plurality of collar locations.

Statement 10: A well measurement system for locating a collar comprising: an electromagnetic logging tool, wherein the electromagnetic logging tool comprises: at least one receiver; and at least one transmitter; a conveyance, wherein the conveyance is attached to the electromagnetic logging tool; and an information handling system, wherein the information handling system is configured to receive an electromagnetic measurement from the electromagnetic logging tool, produce an electromagnetic log from the electromagnetic measurement, wherein the electromagnetic log comprises at least one channel, and locate a position of a collar in the electromagnetic log with a collar signature.

Statement 11: The well measurement system of statement 10, wherein the electromagnetic measurement is taken by the electromagnetic logging tool wherein the electromagnetic logging tool is an induction tool that operates with continuous wave excitation of at least one frequency.

Statement 12: The well measurement system of statement 11 or statement 10, wherein the electromagnetic measurement is taken by the electromagnetic logging tool wherein the electromagnetic logging tool is an induction tool that operates with pulse excitation in time domain.

Statement 13: The well measurement system of statements 10-12, wherein the electromagnetic log is a raw curve comprising a voltage from the at least one channel.

Statement 14: The well measurement system of statements 10-13, wherein the electromagnetic log is processed and comprises a thickness of a casing string or a pipe string.

Statement 15: The well measurement system of statement 10-14, wherein the collar signature is obtained by a synthetic modeling of a collar geometry.

Statement 16: The well measurement system of statements 10-15, wherein the collar signature is obtained from the electromagnetic log.

Statement 17: The well measurement system of statements 10-16, wherein a plurality of collars are located from a plurality of collar signatures.

Statement 18: The well measurement system of statements 10-17, wherein a collar position is determined by a correlation, a covariance, or a misfit between a collar signature and the electromagnetic log.

Statement 19: The well measurement system of statements 10-18, wherein the information handling system is further configured to run an automation process comprising identify collar responses, select channel response, evaluate a comparison function, and identify position of collars from comparison function.

Statement 20: The well measurement system of statements 10-19, wherein the identify positions of collars is done by an algorithm that uses a correlation, a covariance, or a misfit between the collar signature and the electromagnetic log.

Statement 21: The well measurement system of statements 10-20, wherein the identify collar responses is done by an inspection of the electromagnetic log.

Statement 22: The well measurement system of statements 10-21, wherein the identify collar responses is done by a numerical simulation of a collar geometry.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in teinis of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the foini, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining location of a collar in a wellbore, comprising:
   taking an electromagnetic measurement;
   producing an electromagnetic log from the electromagnetic measurement, wherein the electromagnetic log comprises a plurality of channels, wherein each of the plurality of channels is a distance between a receiver and a transmitter; and
   locating a position of the collar in a first casing and a second casing in the electromagnetic log based on a collar signature in the electromagnetic log, wherein the collar signature comprises at least one channel from the plurality of channels.

2. The method of claim 1, wherein the electromagnetic log is a raw curve comprising a voltage from the at least one channel, and/or wherein the electromagnetic log is processed and comprises a thickness of at least one casing string or at least one pipe string.

3. The method of claim 1, wherein the collar signature is identified by a synthetic modeling of a collar geometry, and/or wherein the collar signature is obtained from the electromagnetic log.

4. The method of claim 1, wherein positions of a plurality of collars are identified by using at least one collar signature and the electromagnetic log.

5. The method of claim 4, wherein the locating a position of the collar comprises taking a correlation, a covariance, or a misfit between the collar signature and the electromagnetic log.

6. The method of claim 4, wherein a periodicity of the collar is used to filter the locating a position of the collar.

7. The method of claim 4, wherein a level of agreement between a plurality of collar locations obtained from different channels is used to filter the plurality of collar locations.

8. A well measurement system for locating a collar comprising:
an electromagnetic logging tool, wherein the electromagnetic logging tool comprises:
at least one receiver; and
at least one transmitter;
a conveyance, wherein the conveyance is attached to the electromagnetic logging tool; and
an information handling system, wherein the information handling system is configured to receive an electromagnetic measurement from the electromagnetic logging tool, produce an electromagnetic log from the electromagnetic measurement, wherein the electromagnetic log comprises at least one channel, wherein the at least one channel is a distance between the receiver and the transmitter, and locate a position of a collar in a first casing and a second casing in the electromagnetic log with a collar signature.

9. The well measurement system of claim 8, wherein the electromagnetic measurement is taken by the electromagnetic logging tool wherein the electromagnetic logging tool is an induction tool that operates with continuous wave excitation of at least one frequency.

10. The well measurement system of claim 8, wherein the electromagnetic measurement is taken by the electromagnetic logging tool wherein the electromagnetic logging tool is an induction tool that operates with pulse excitation in time domain.

11. The well measurement system of claim 8, wherein the electromagnetic log is a raw curve comprising a voltage from the at least one channel.

12. The well measurement system of claim 8, wherein the electromagnetic log is processed and comprises a thickness of a casing string or a pipe string.

13. The well measurement system of claim 8, wherein the collar signature is obtained by a synthetic modeling of a collar geometry.

14. The well measurement system of claim 8, wherein the collar signature is obtained from the electromagnetic log.

15. The well measurement system of claim 8, wherein a plurality of collars are located from a plurality of collar signatures.

16. The well measurement system of claim 8, wherein the collar position is determined by a correlation, a covariance, or a misfit between a collar signature and the electromagnetic log.

17. The well measurement system of claim 8, wherein the information handling system is further configured to run an automation process comprising identify collar responses, select channel response, evaluate a comparison function, and identify position of collars from comparison function.

18. The well measurement system of claim 17, wherein the identify positions of collars is done by an algorithm that uses a correlation, a covariance, or a misfit between the collar signature and the electromagnetic log.

19. The well measurement system of claim 17, wherein the identify collar responses is done by an inspection of the electromagnetic log.

20. The well measurement system of claim 17, wherein the identify collar responses is done by a numerical simulation of a collar geometry.

* * * * *